United States Patent [19]
Nakatsukasa et al.

[11] Patent Number: 6,106,244
[45] Date of Patent: Aug. 22, 2000

[54] FUEL APPARATUS HAVING FUEL FILTER AND IN-TANK TYPE FUEL PUMP

[75] Inventors: Masami Nakatsukasa, Handa; Koji Izutani, Nagoya, both of Japan

[73] Assignee: Denso Corporation, Japan

[21] Appl. No.: 09/208,475

[22] Filed: Dec. 10, 1998

[30] Foreign Application Priority Data

Jan. 7, 1998 [JP] Japan ................................ 10-001467

[51] Int. Cl.⁷ .......................... B01D 35/027; B01D 35/26
[52] U.S. Cl. .......................... 417/313; 123/510; 210/445; 210/455; 210/456; 210/498; 417/423.3
[58] Field of Search .................................. 123/509, 510, 123/514, 511; 417/313, 410.1, 423.3; 210/172, 227, 228, 229, 231, 445, 453, 455, 456, 498

[56] References Cited

U.S. PATENT DOCUMENTS

| | | | |
|---|---|---|---|
| 759,903 | 5/1904 | Moeckel | 210/447 |
| 966,963 | 8/1910 | Steinkoenig | 210/455 X |
| 2,809,754 | 10/1957 | Pudlo | 210/445 X |
| 3,025,963 | 3/1962 | Bauer | 210/493.4 |
| 3,288,299 | 11/1966 | Paton et al. | 210/487 |
| 3,716,970 | 2/1973 | Stupf et al. | 55/521 |
| 3,870,495 | 3/1975 | Dixson et al. | 55/489 |
| 4,439,321 | 3/1984 | Taki et al. | 210/493.1 |
| 4,697,632 | 10/1987 | Lirones | 164/369 |
| 5,076,920 | 12/1991 | Danowski et al. | 210/243 |
| 5,078,167 | 1/1992 | Brandt et al. | 137/549 |
| 5,195,494 | 3/1993 | Tuckey | 123/514 |
| 5,279,731 | 1/1994 | Cook et al. | 210/232 |
| 5,392,750 | 2/1995 | Laue et al. | 123/509 |
| 5,562,825 | 10/1996 | Yamada et al. | 210/321.74 |
| 5,782,223 | 7/1998 | Yamashita et al. | 123/510 |
| 5,807,481 | 9/1998 | Hodgkins et al. | 210/445 X |
| 5,900,148 | 5/1999 | Izutani et al. | 210/416.4 |

FOREIGN PATENT DOCUMENTS

| | | |
|---|---|---|
| 0630672 | 12/1994 | European Pat. Off. . |
| 53-35267 | 4/1978 | Japan . |
| 58-27609 | 2/1983 | Japan . |
| 59-142818 | 8/1984 | Japan . |
| 59-184919 U | 12/1984 | Japan . |
| B2-60-56523 | 3/1985 | Japan . |
| Y2-62-7368 | 2/1987 | Japan . |
| 2-191862 | 7/1990 | Japan . |
| 2-127766 U | 10/1990 | Japan . |
| 3-108853 U | 11/1991 | Japan . |

*Primary Examiner*—Tony M. Argenbright
*Attorney, Agent, or Firm*—Nixon & Vanderhye PC

[57] ABSTRACT

A filter element is made of a mold body of filter materials and sandwiched between protrusions of a pump casing and a flange, so that the filter element may be assembled easily with the pump casing and the flange. The filter element is disposed within a fuel tank together with a fuel pump and a pressure regulator. Fuel discharged from the fuel pump is led laterally through fuel communication passages along the fuel inlet side surface of the filter element, so that the fuel may flow uniformly across the filter element.

20 Claims, 5 Drawing Sheets

FUEL APPARATUS HAVING FUEL FILTER AND IN-TANK TYPE FUEL PUMP

CROSS REFERENCE TO RELATED APPLICATION

This application relates to and incorporates herein by reference Japanese Patent Application No. 10-1467 filed on Jan. 7, 1998.

BACKGROUND OF THE INVENTION

1. Field of the Invention

The present invention relates to a fuel apparatus having a fuel filter for removing foreign particles in fuel.

2. Description of Related Art

As a fuel filter for an in-tank type fuel pump device for a vehicle, PCT International Publication No. WO96/23569 (Izutani et al U.S. Ser. No. 08/668,476) proposes a fuel filter which has a C-shaped cross section to be mounted around an outer periphery of a fuel pump.

In this fuel filter, a filter element is attached to a filter casing by an adhesive, resulting in troublesome assembly and an increase in production costs.

Further, the filter element is formed by stacking filter materials, resulting in a limitation in filter shape. This makes it impossible as well to form the filter into a shape which corresponds to an available space between other component part, so that the fuel pump device can be reduced in size to be mounted within a fuel tank. In addition, as the filter element has ineffective spaces which do not contribute to removal of the foreign particles, the filter element has to be large in size to provide a sufficient filtering capacity.

Still further, as the fuel is pumped out from the fuel tank through a bent fuel passage, a loss in fuel pressure increases.

SUMMARY OF THE INVENTION

It is an object of the present invention to provide a fuel apparatus having a fuel filter, which has a long life and can be assembled easily.

It is another object of the present invention to provide a fuel apparatus having a fuel filter, which has a high filtering efficiency and can be formed into a compact shape.

It is a still another object of the present invention to provide a fuel apparatus having a fuel filter and an in-tank type fuel pump device, which has a long life in a compact shape and can be assembled easily.

According to the present invention, a fuel filter has a support structure, by which a filter element is supported by ribs provided at both a fuel inlet side surface and a fuel outlet side surface without using an adhesive. The ribs are shaped to provide fuel passages adjacent to the fuel inlet side and the fuel outlet side, so that the passages lead fuel in a direction parallel to the fuel inlet side surface and the fuel outlet side surface. The fuel passages at the fuel inlet side surface enable the fuel to flow in various lateral directions to remove foreign particles in the fuel. Thus, the removed foreign particles do not accumulate at only a few locations in the filter element. That is, the filter element is less likely to be clogged, resulting in a longer useful life.

Preferably, the ribs are formed integrally with a pump casing and a flange, which are engaged with each other to sandwich the filter element therebetween. The filter element is disposed within a fuel tank together with a fuel pump and a pressure regulator.

BRIEF DESCRIPTION OF THE DRAWINGS

Other objects, features and advantages of the present invention will become apparent from the following detailed description made with reference to the accompanying drawings.

In the drawings.

DETAILED DESCRIPTION OF THE PREFERRED EMBODIMENT

Figure 1:
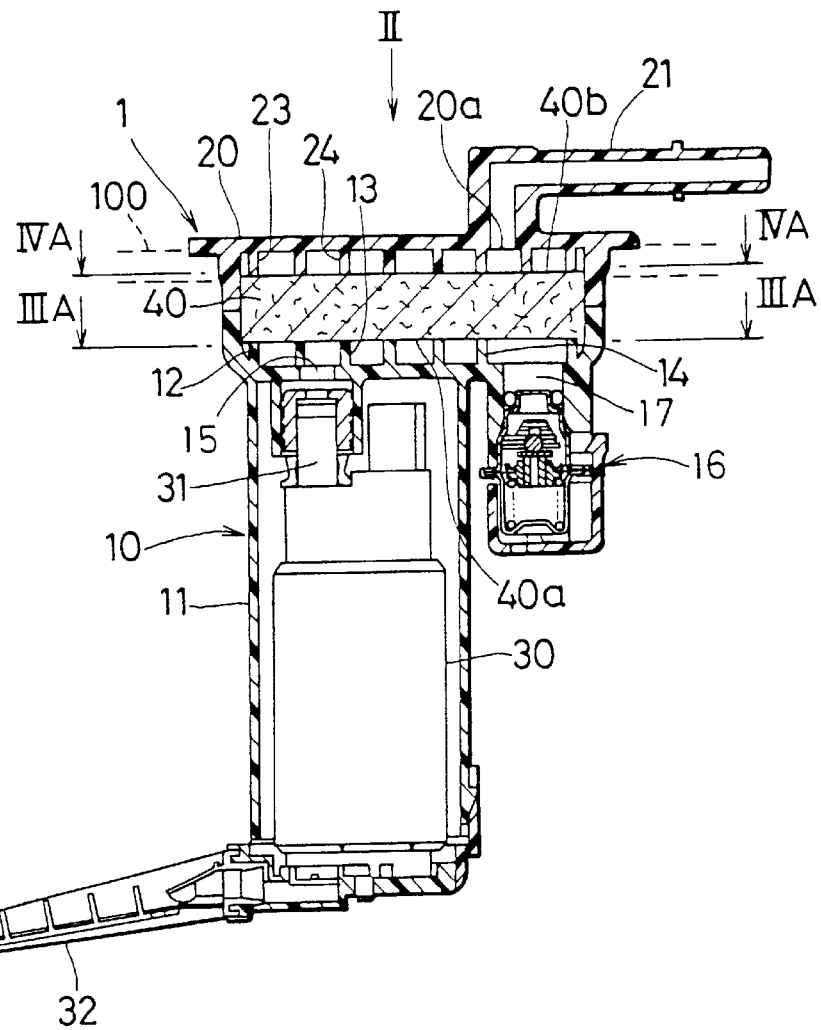
FIG. 1 is a sectional view showing a fuel pump device according to a first embodiment of the present invention.

The present invention will be described in detail with reference to presently preferred exemplary embodiments, throughout which the same or like reference numerals are used to designate the same or like component parts.

[First Embodiment]

Figure 2:
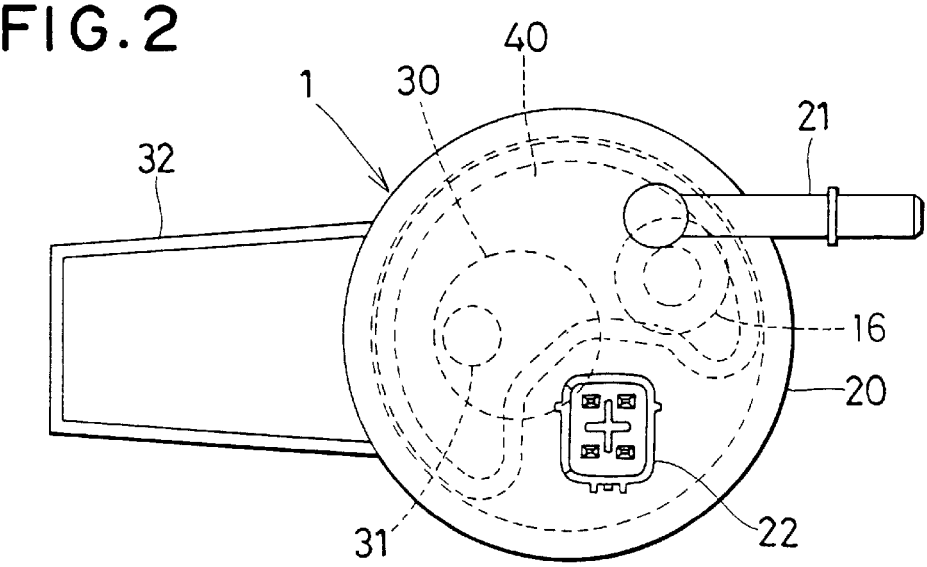
FIG. 2 is a top plan view showing the fuel pump device according to the first embodiment.

Referring first to FIGS. 1 and 2, a fuel pump device 1 has a casing 10, which is composed of a pump casing 11 made of resin and a flange 20 made of resin. The fuel pump device 1 is disposed within a fuel tank (not shown) by engaging the flange 20 with a tank body 100. The flange 20 is mounted on the pump casing 11 and has a fuel supply pipe 21, which is connected to fuel injectors (not shown). The flange 20 has an electrical connector 22 through which electric power is supplied to drive the pump 30. The connector 22 is used also to feed electric signals produced from a fuel level gauge (not shown) and a fuel temperature sensor (not shown), both being disposed within the fuel tank. The pump casing 11 and the flange 20 are used as a filter casing to accommodate a filter element 40 therein. Thus, a fuel filter is provided by an assembly of the pump casing 11, flange 20 and the filter element 40.

A fuel pump 30 is accommodated within a cylindrical part of the pump casing 11. The fuel pump 30 is attached to a fuel strainer 32 at its bottom and a fuel discharge port 31 at its top, so that fuel is sucked through the strainer 32 and discharged from the discharge port 31. The pump casing 11 has a fuel inlet 15 above the discharge port 31 to supply the discharged fuel into the filter element 40. A pressure regulator 16 is attached to the pump casing 11 so that it regulates the pressure of fuel supplied to the injectors through the pipe 21.

The flange 20 has a fuel outlet 20a through which the fuel is supplied from the filter element 40 to the pipe 21. The fuel inlet 15 and fuel outlet 20a are located below and above a bottom surface 40a and a top surface 40b of the filter element 40. The fuel inlet 15 and fuel outlet 20a are located away from each other in a radial direction of the filter element 40.

The filter element 40 is formed by molding fibrous filter material solution into a generally flat body shape. The filter element 40 thus molded and dried is sandwiched between the pump casing 11 and the flange 20 to remove foreign particles, which enter through the strainer 32, before being supplied to the fuel pipe 21.

Figure 3A:
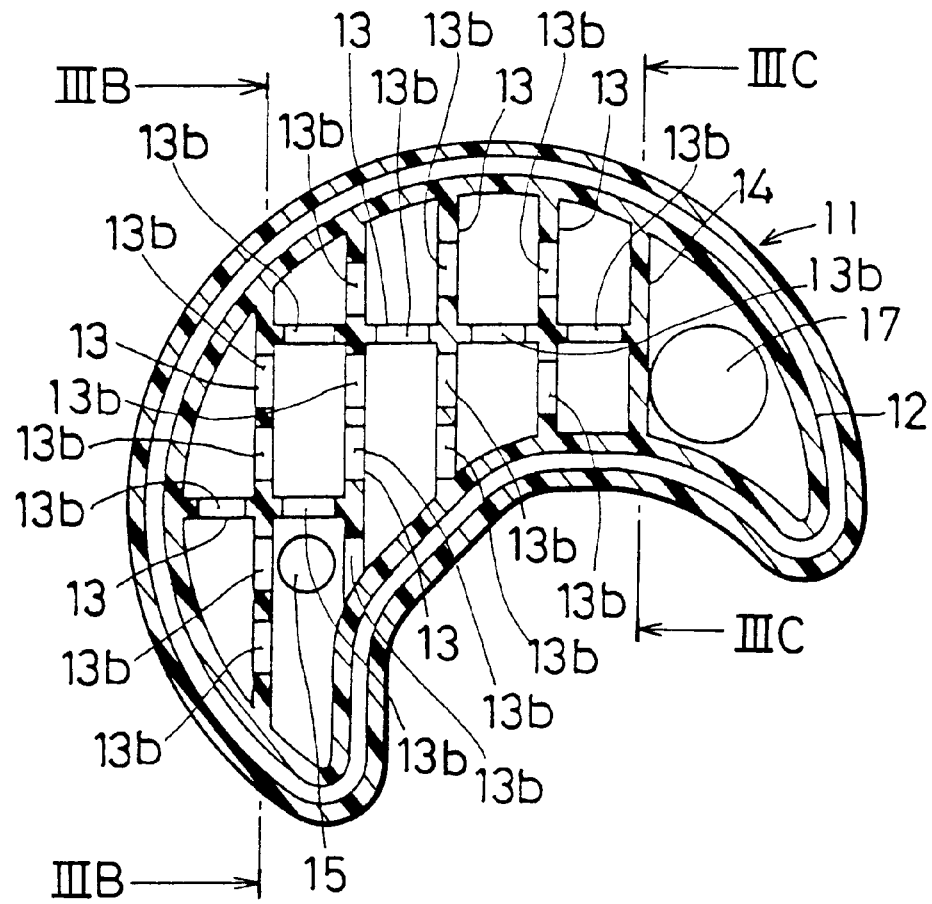
FIGS. 3A–3C are sectional views of component parts used in the fuel pump device according to the first embodiment.
Figure 3B:
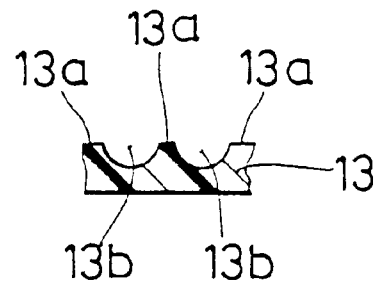
Figure 3C:
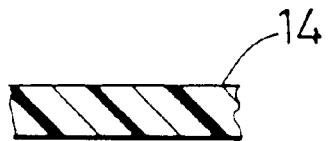

As shown in FIGS. 3A–3C, the pump casing 11 has at its inner side a closed-type rib 12, and at the inner side of the rib 12 a plurality of ribs 13, 14 arranged in a lattice. The ribs 12, 13, 14 extend upwardly toward the filter element 40. The ribs 12, 13, 14 are integrally molded with the other part of the pump casing 10. The ribs 12, 14 are provided to encircle a fuel discharge port 17 of the pressure regulator 16. Each of the ribs 12, 13, 14 has its top surface, which abuts with the bottom surface 40a of the filter element 40.

In addition, each rib 13 has concavities 13b on the top surface 13a, which abuts with the filter element 40. The concavities 13b provide a communication passage to allow the fuel to flow laterally along the bottom surface 40a of the filter element 40. To the contrary, the ribs 12, 14 have no concavities on the top surfaces thereof. Thus, the rib 12 abuts with the entire peripheral part of the bottom surface 40a to seal between the pump casing 11 and the filter element 40, thereby restricting the fuel from directly entering into a space between the inner peripheral surface of the pump casing 11 and the outer peripheral surface of the filter element 40.

Figure 4A:
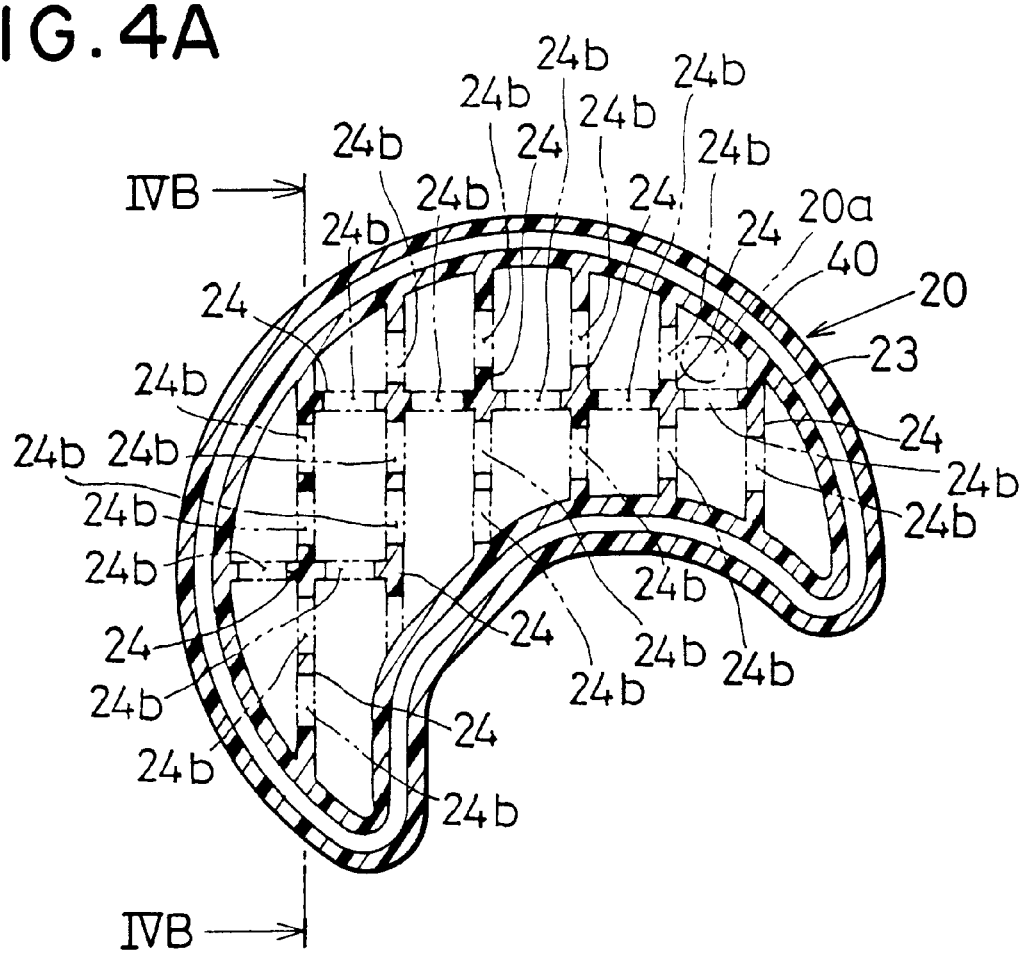
FIGS. 4A and 4B are sectional views of component parts used in the fuel pump device according to the first embodiment.
Figure 4B:
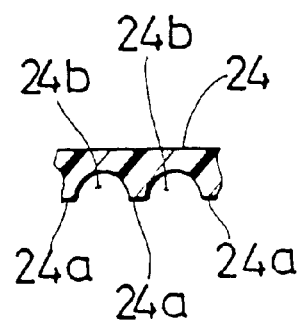

As shown in FIGS. 4A, 4B, the flange 20 has at its inner side a closed-type rib 23 opposing the closed-type rib 12, and at the inner side of the rib 23 a plurality of ribs 24 arranged in a lattice and opposing the ribs 13, 14. The ribs 23, 24 extend downwardly toward the filter element 40. The ribs 23, 24 are integrally molded with the other part of the flange 20. Each of the ribs 23, 24 has its bottom surface, which abuts with the top surface 40b of the filter element 40. Each rib 24 has concavities 24b on the bottom surface 24a, which abuts with the filter element 40. The concavities 24b provide a communication passage to allow the fuel to flow laterally along the top surface 40b of the filter element 40.

The pump casing 11 and the flange 20 is fixed to each other by a thread engagement, welding or the like, so that the filter element 40 is supported between the pump casing 11 and the flange 20 without using any adhesive.

In the first embodiment, the fuel pump 30 sucks the fuel in the fuel tank through the strainer 32 and discharges the same after pressurization through the discharge port 31. The fuel flows laterally underside the fuel filter 40 through the concavities 13b in various directions. As the fuel discharge port 17 of the pressure regulator 17 is encircled by the ribs 12 and 14 having no concavities, the fuel flowing underside the filter element 40 does not flow into the pressure regulator 16 without passing through the fuel filter 40.

With the fuel inlet 15 and the outlet 20a being dislocated from each other in the lateral direction, the fuel entering into the filter element 40 from the bottom surface 40a flows transversely across the filter element 40 toward the fuel outlet 20a. The fuel passing through the filter element 40 then flows laterally along the top surface 40b of the filter element 40 toward the fuel outlet 20a through the concavities 24b. Thus, the fuel is supplied to the fuel injectors through the fuel outlet 20a and the fuel supply pipe 21.

As the closed-type ribs 12, 23 and the lattice-type ribs 13, 14, 24 provided as protrusions support the filter element 40 while abutting generally uniformly with the bottom surface 40a and the top surface 40b, the filter element 40 is restricted from deforming.

[Second Embodiment]

Figure 5:
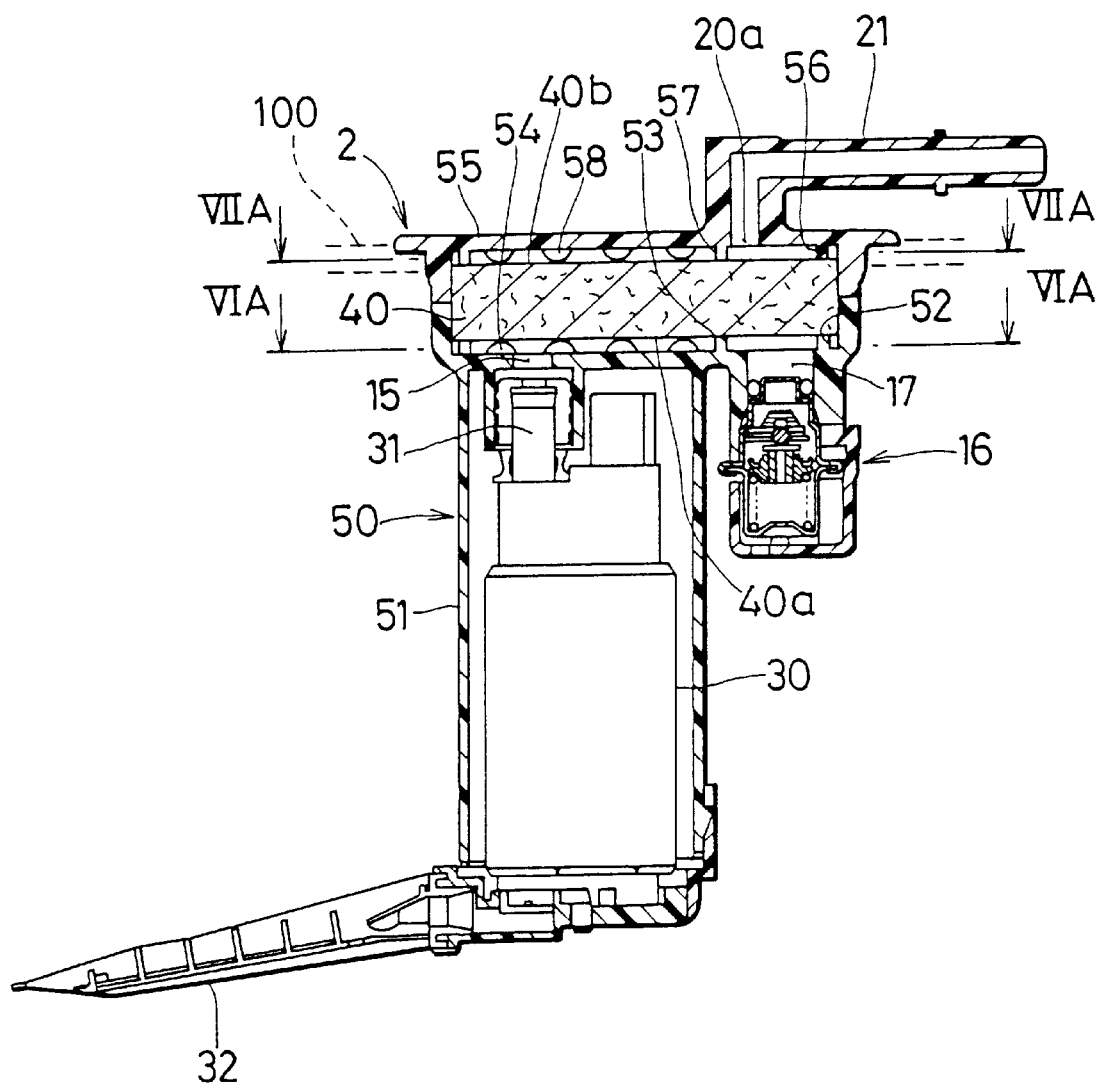
FIG. 5 is a sectional view showing a fuel pump device according to a second embodiment of the present invention.

Referring next to FIG. 5, a fuel pump device 2 has a casing 50, which is composed of a pump casing 51 made of resin and a flange 55 made of resin. The fuel pump device 2 is disposed within a fuel tank (not shown) by engaging the flange 55 with a tank body. The flange 55 is mounted on the pump casing 51 and has the fuel supply pipe 21, which is connected to fuel injectors (not shown). The pump casing 51 and the flange 55 are used as a filter casing to accommodate the filter element 40 therein. Thus, a fuel filter is provided by an assembly of the pump casing 51, flange 55 and the filter element 40.

Figure 6A:
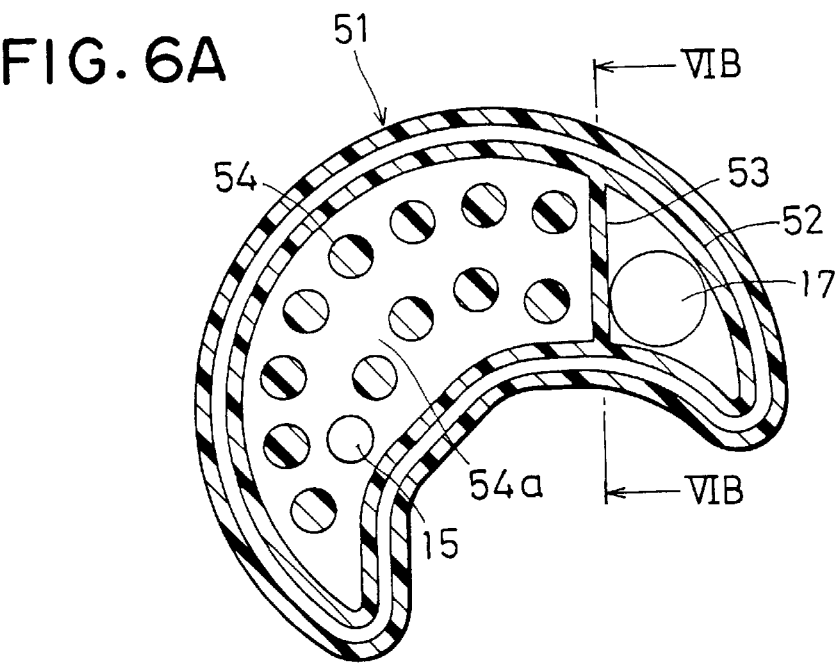
FIGS. 6A and 6B are sectional views of component parts used in the fuel pump device according to the second embodiment.
Figure 6B:

As shown in FIGS. 6A, 6B, the pump casing 51 has at its inner side a closed-type rib 52, and at the inner side of the rib 52 a rib 53. The ribs 52, 53 are provided to encircle the fuel discharge port 17 of the pressure regulator 16. Each of the ribs 52, 53 has its top surface, which abuts with the bottom surface 40a of the filter element 40. Thus, the rib 52 abuts with the entire peripheral part of the bottom surface 40a to seal between the pump casing 51 and the filter element 40, thereby restricting the fuel from directly entering into a space between the inner peripheral surface of the pump casing 11 and the outer peripheral surface of the filter element 40.

In this embodiment, the pump casing 51 has a plurality of hemispherical convexities 54, which protrude toward the filter element 40 and abut the bottom surface 40a. Communication passages 54a are provided amongst the convexities 54 to allow the fuel entering through the discharge port 15 to flow laterally in various directions.

Figure 7A:
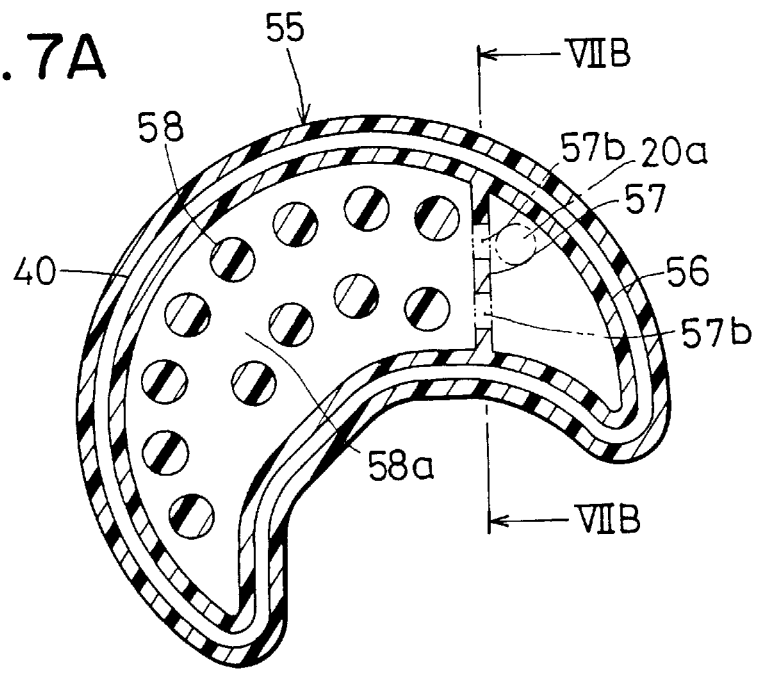
FIGS. 7A and 7B are sectional views of component parts used in the fuel pump device according to the second embodiment.
Figure 7B:
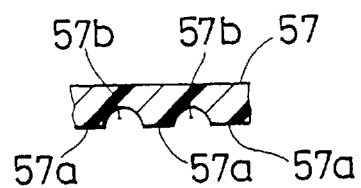

As shown in FIGS. 7A, 7B, the flange 55 has at its inner side a closed-type rib 56 opposing the rib 52, and at the inner side of the rib 23 a rib 57 opposing the rib 53. The ribs 56, 57 extend downwardly toward the filter element 40. The ribs 56, 57 are integrally molded with the other part of the flange 55. The ribs 56, 57 encircle the fuel outlet 20a. Each of the ribs 56, 57 has its bottom surface, which abuts with the top surface 40b of the filter element 40. The flange 55 has a plurality of hemispherical convexities 58 protruding downwardly toward the filter element 40 and opposing the convexities 54. The convexities 58 abut with the top surface 40b at positions opposing the ribs 54 of the pump casing 51.

The rib 57 has a concavity 57b on its bottom surface 57a. Communication passages 58a are provided amongst the convexities 58. Thus, the fuel passing through the filter element 40 is allowed to flow laterally toward the fuel outlet 20a.

In this embodiment also, the pump casing 51 and the flange 55 is fixed to each other by a thread engagement, a latch engagement or the like, so that the filter element 40 is supported between the pump casing 51 and the flange 55 without using any adhesive.

The fuel flows laterally underside the fuel filter 40 through the communication passages 54a in various directions. As the fuel discharge port 16 of the pressure regulator 17 is encircled by the ribs 52 and 53 having no concavities, the fuel flowing underside the filter element 40 does not flow into the pressure regulator 16 without passing through the fuel filter 40. The fuel entering into the filter element 40 from the bottom surface 40a flows transversely across the filter element 40 toward the fuel outlet 20a. The fuel passing through the filter element 40 then flows laterally along the top surface 40b of the filter element 40 toward the fuel outlet 20a through the communication passages 58a. Thus, the fuel is supplied to the fuel injectors through the fuel outlet 20a and the fuel supply pipe 21.

The above embodiments provide the following advantages.

(1) As the filter element 40 is supported by protrusions (ribs and convexities) formed integrally with the pump casing and the flange, the filter element 40 can be assembled with the pump casing and the flange by a simple process without using any adhesive.

(2) As the filter element 40 is disposed within the space existing between the fuel supply pipe 21 and the fuel pump 30, the fuel pump 30 can be reduced in diameter without increasing its length so much as compared with the case where a filter element is disposed to surround the outer periphery of the fuel pump.

(3) As the fuel flows laterally underside the bottom surface 40a and then through the entire cross sectional area of the filter element 40, the filter element 40 is less likely to be clogged locally.

(4) As the filter element 40 is made of a mold body which has the least inner space which cannot remove the foreign particles, the filter element 40 can have a high filtering efficiency in compact size. As a result, the fuel pump device can also be reduced in size.

(5) As the fuel is allowed to flow from the fuel inlet 15 to the fuel outlet 20a without changing flow direction so much, the loss of fuel pressure is reduced. Thus, discharge amount of fuel of the fuel pump is increased, and the longevity of the filter element 40 is improved.

In the above embodiments, a filter casing for a filter element may be provided separately from the pump casing and the flange which form the filter casing. The fuel filter may be provided outside of the fuel tank separately from the fuel pump.

The present invention should not be restricted to the disclosed embodiments and modifications thereof, but may be implemented in many other ways without departing from the spirit of the invention.

What is claimed is:

1. A fuel apparatus comprising:
   a filter element having a fuel inlet side surface and a fuel outlet side surface and adapted to remove foreign particles in fuel in a fuel tank, the filter element being formed into a generally flat body shape having a predetermined thickness, with the fuel inlet side surface and the fuel outlet side surface extending in parallel with each other; and
   a filter casing accommodating the filter element therein, the filter casing having a fuel inlet opening to the fuel inlet side surface and a fuel outlet opening to the fuel outlet side surface, the fuel inlet and the fuel outlet being respectively formed so that an axis of each is substantially perpendicular to the fuel inlet side surface and the fuel outlet side surface, respectively, the fuel outlet being laterally displaced from the fuel inlet in a lateral direction parallel with the fuel inlet side surface and the fuel outlet side surface, the filter casing having a plurality of protrusions which abut with the fuel inlet side surface and the fuel outlet side surface to support the filter element therebetween, and the filter casing having communication passages amongst the protrusions to allow the fuel to flow laterally therethrough along the fuel inlet side surface and the fuel outlet side surface of the filter element.

2. A fuel apparatus as in claim 1, wherein the protrusions include ribs arranged in a lattice form and extending toward the fuel inlet side surface and the fuel outlet side surface of the filter element.

3. A fuel apparatus as in claim 1, wherein the filter element is made of a molded body of filter materials.

4. A filter apparatus as in claim 1, further comprising:
   a fuel pump disposed in the fuel tank and connected to the fuel inlet of the filter casing; and
   a fuel supply pipe disposed outside of the fuel tank and connected to the fuel outlet of the filter casing.

5. A filter apparatus as in claim 1, wherein the protrusions include ribs extending respectively toward the fuel inlet side surface and the fuel outlet side surface and wherein said communication passages include concavities in the surface of at least some of said ribs that face the filter element, thereby to allow the fuel to flow laterally along the respective surface of the filter element.

6. A filter apparatus as in claim 5, wherein one of said ribs is free from concavities and abuts an entire peripheral part of the bottom surface of said filter element to define a peripheral seal thereby restricting fuel to flow through the filter element.

7. A filter apparatus comprising:
   a filter element having a fuel inlet side surface and a fuel outlet side surface to remove foreign particles in fuel in a fuel tank;
   a filter casing accommodating the filter element therein, the filter casing having a fuel inlet at the fuel inlet side surface and a fuel outlet at the fuel outlet side surface, the filter casing having a plurality of protrusions which abut with the fuel inlet side surface and the fuel outlet side surface to support the filter element therebetween, and the filter casing having communication passages amongst the protrusions to allow the fuel to flow laterally therethrough along the fuel inlet side surface and the fuel outlet side surface of the filter element;
   a fuel pump disposed in the fuel tank and connected to the fuel inlet of the filter casing; and
   a fuel supply pipe disposed outside of the fuel tank and connected to the fuel outlet of the filter casing,
   wherein the filter casing includes:
   a pump casing accommodating the fuel pump therein and having the protrusions extending upwardly at a position between the fuel pump and the filter element; and
   a flange attached to the fuel tank and fixed to the pump casing, the flange having the protrusions extending downwardly at a position above the filter element.

8. A fuel apparatus as in claim 7, wherein the fuel inlet and the fuel outlet are displaced away from each other in a lateral direction.

9. A filter apparatus as in claim 5, wherein the protrusions are provided in a lattice form on the pump casing and the flange, and the protrusions of the pump casing and the flange have concavities which provide the communication passages above the fuel inlet side surface and underside the fuel outlet side surface.

10. A filter apparatus as in claim 9, wherein the protrusions are formed on the pump casing and the flange to oppose each other.

11. A filter apparatus as in claim 7, wherein the protrusions are each formed in a convexity form on the pump casing and the flange, and the communication passages are provided above the fuel inlet side surface and underside the fuel outlet side surface by spaces amongst the convexities.

12. A filter apparatus as in claim 7, wherein the convexities are formed on the pump casing and the flange to oppose each other.

13. A filter apparatus for a fuel tank comprising:
   a filter element formed into a generally flat body shape having a predetermined thickness and having a fuel inlet side surface and a fuel outlet side surface extending generally in parallel with each other;
   a top casing covering the fuel outlet side surface and having a fuel outlet, the fuel outlet being formed so that an axis thereof is substantially perpendicular to the fuel outlet side surface, the top casing having a plurality of protrusions abutting with the fuel outlet side surface of the filter element and having a plurality of fuel communication passages extending laterally along the fuel outlet side surface and communicating with the fuel outlet; and a bottom casing covering the fuel inlet side surface, the bottom casing being fixed to the top casing to sandwich the filter element therebetween and having a fuel inlet, the fuel inlet being formed so that an axis thereof is substantially perpendicular to the fuel inlet side surface, the bottom casing having a plurality of protrusions abutting with the fuel inlet side surface of the filter element and having a plurality of fuel communication passages extending laterally along the fuel inlet side surface and communicating with the fuel inlet, wherein the fuel outlet is laterally displaced from the fuel inlet in a lateral direction parallel with the fuel inlet side surface and the fuel outlet side surface.

14. A filter apparatus as in claim 13, wherein the protrusions of the top housing and the protrusions of the bottom casing are provided to oppose each other sandwiching the filter element.

15. A filter apparatus as in claim 14, wherein the protrusions include ribs extending respectively toward the fuel inlet side surface and the fuel outlet side surface and wherein said communication passages include concavities in the surface of at least some of said ribs that face the filter element, thereby to allow the fuel to flow laterally along the respective surface of the filter element.

16. A filter apparatus comprising:

a filter element formed into a flat shape and having a fuel inlet side surface and a fuel outlet side surface;

a top casing covering the fuel outlet side surface and having a fuel outlet, the top casing having a plurality of protrusions abutting with the fuel outlet side surface of the filter element and having a plurality of fuel communication passages extending laterally along the fuel outlet side surface and communicating with the fuel outlet;

a bottom casing covering the fuel inlet side surface, the bottom casing being fixed to the top casing to sandwich the filter element therebetween and having a fuel inlet, the bottom casing having a plurality of protrusions abutting with the fuel inlet side surface of the filter element and having a plurality of fuel communication passages extending laterally along the fuel inlet side surface and communicating with the fuel inlet;

a fuel pump supported by the bottom casing in the fuel tank and connected to the fuel inlet; and a fuel supply pipe disposed outside of the fuel tank and connected to the fuel outlet.

17. A filter apparatus as in claim 14, wherein the fuel outlet and the fuel inlet are displaced from each other in a lateral direction of the filter element.

18. A filter apparatus as in claim 17, further comprising:

a pressure regulator disposed adjacently to the fuel pump and sealed from a direct communication with the fuel communication passages below the fuel inlet side surface of the filter element.

19. A filter apparatus as in claim 18, wherein the bottom casing has a wall extending upwardly and abutting with the fuel inlet side surface of the filter element to seal the communication passage and the pressure regulator.

20. A filter apparatus as in claim 11, wherein the fuel pump and the pressure regulator are disposed substantially within an outer periphery of the filter element.

* * * * *